United States Patent
Nilsson

(10) Patent No.: US 10,344,647 B2
(45) Date of Patent: Jul. 9, 2019

(54) METHOD AND SYSTEM FOR A FIRST AND A SECOND SUPPLY OF ADDITIVE TO AN EXHAUST GAS STREAM FROM AN INTERNAL COMBUSTION ENGINE

(71) Applicant: Scania CV AB, Södertälje (SE)

(72) Inventor: Magnus Nilsson, Årsta (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/750,167

(22) PCT Filed: Aug. 25, 2016

(86) PCT No.: PCT/SE2016/050794
§ 371 (c)(1),
(2) Date: Feb. 2, 2018

(87) PCT Pub. No.: WO2017/034463
PCT Pub. Date: Mar. 2, 2017

(65) Prior Publication Data
US 2018/0258811 A1    Sep. 13, 2018

(30) Foreign Application Priority Data
Aug. 27, 2015 (SE) ........................... 1551111

(51) Int. Cl.
*F01N 3/035*    (2006.01)
*F01N 3/10*    (2006.01)
(Continued)

(52) U.S. Cl.
CPC ............ *F01N 3/206* (2013.01); *F01N 3/035* (2013.01); *F01N 3/103* (2013.01); *F01N 3/208* (2013.01);
(Continued)

(58) Field of Classification Search
CPC ............ B01D 53/9418; B01D 53/9477; B01D 2257/402; B01D 2257/404;
(Continued)

(56) References Cited

U.S. PATENT DOCUMENTS 5,120,695 A    6/1992 Blumrich et al.
5,239,860 A    8/1993 Harris et al.
(Continued)

FOREIGN PATENT DOCUMENTS

DE    3733501 A1    4/1989
DE    102006031650 A1    1/2008
(Continued)

OTHER PUBLICATIONS

Botar-Jid, Claudiu Cristian (2007)—Selective catalytic reduction of nitrogen oxides with ammonia in forced unsteady state reactors—Case based reasoning and mathematical model simulation reasoning; Retrieved online from http://urn.fi/URN:ISBN:978-952-214-469-0; p. 3, second paragraph.
(Continued)

*Primary Examiner* — Timothy C Vanoy
(74) *Attorney, Agent, or Firm* — Moore & Van Allen PLLC; W. Kevin Ransom

(57) ABSTRACT

Provided are a method and a system for treatment of an exhaust stream, from a combustion engine comprising nitrogen oxides. An estimate of at least one future operating condition for the exhaust treatment system is determined based on a road section ahead of the vehicle. A first additive is input into the exhaust stream to cause a first reduction of nitrogen oxides in a first reduction catalyst device. A second additive is input into the exhaust stream to cause a second reduction of a second amount of nitrogen oxides in a second reduction catalyst device, arranged downstream of the first reduction catalyst device. The first supply of additive is
(Continued)

controlled based on the estimated at least one future operating condition, such that the first reduction catalyst device is exposed, over time, to a substoichiometric condition, with respect to the first additive and the first amount of nitrogen oxides.

38 Claims, 5 Drawing Sheets

(51) Int. Cl.
    *F01N 3/20*     (2006.01)
    *F01N 13/00*     (2010.01)
    *G08G 1/0967*     (2006.01)
    *G08G 1/0962*     (2006.01)
    *F01N 9/00*     (2006.01)

(52) U.S. Cl.
    CPC .............. *F01N 3/2066* (2013.01); *F01N 9/00* (2013.01); *F01N 13/0093* (2014.06); *G08G 1/09623* (2013.01); *G08G 1/09626* (2013.01); *G08G 1/096716* (2013.01); *G08G 1/096758* (2013.01); *G08G 1/096775* (2013.01); *G08G 1/096791* (2013.01); *F01N 2560/026* (2013.01); *F01N 2560/06* (2013.01); *F01N 2560/14* (2013.01); *F01N 2610/02* (2013.01); *F01N 2900/08* (2013.01); *F01N 2900/102* (2013.01); *F01N 2900/12* (2013.01); *F01N 2900/1411* (2013.01); *F01N 2900/1602* (2013.01); *F01N 2900/1606* (2013.01); *F01N 2900/1621* (2013.01); *F01N 2900/1812* (2013.01); *Y02A 50/2325* (2018.01); *Y02T 10/24* (2013.01)

(58) Field of Classification Search
    CPC .......... B01D 2258/01; B01D 2258/012; F01N 3/021; F01N 3/023; F01N 3/033; F01N 3/035; F01N 3/2066; F01N 3/2073; F01N 2250/02; F01N 2390/00; F01N 2430/00; F01N 2570/14
    See application file for complete search history.

(56) References Cited

U.S. PATENT DOCUMENTS

| | | |
|---|---|---|
| 8,544,260 B2 | 10/2013 | Boorse et al. |
| 9,670,855 B2 | 6/2017 | Dickson et al. |
| 2004/0040289 A1 | 3/2004 | Mazur et al. |
| 2004/0098979 A1 | 5/2004 | Hammerle et al. |
| 2005/0069476 A1 | 3/2005 | Blakeman et al. |
| 2005/0232830 A1 | 10/2005 | Bruck |
| 2006/0010857 A1 | 1/2006 | Hu et al. |
| 2006/0039843 A1 | 2/2006 | Patchett et al. |
| 2007/0122317 A1 | 5/2007 | Driscoll et al. |
| 2007/0150154 A1 | 6/2007 | Lenz |
| 2008/0060348 A1 | 3/2008 | Robel et al. |
| 2009/0031702 A1 | 2/2009 | Robel |
| 2009/0035194 A1 | 2/2009 | Robel et al. |
| 2009/0035195 A1 | 2/2009 | Robel |
| 2010/0024393 A1 | 2/2010 | Chi et al. |
| 2010/0175372 A1 | 7/2010 | Lambert et al. |
| 2010/0252737 A1 | 10/2010 | Fournel et al. |
| 2010/0319320 A1 | 12/2010 | Mital et al. |
| 2011/0162347 A1 | 7/2011 | Katare et al. |
| 2011/0211193 A1 | 9/2011 | Saveliev et al. |
| 2011/0271664 A1 | 11/2011 | Boorse et al. |
| 2011/0295484 A1 | 12/2011 | L'Henoret |
| 2011/0313635 A1 | 12/2011 | Blanc et al. |
| 2012/0117954 A1 | 5/2012 | Yasui et al. |
| 2012/0255286 A1 | 10/2012 | Matsunaga et al. |
| 2013/0078173 A1 | 3/2013 | Cox |
| 2013/0116881 A1 | 5/2013 | Bogema et al. |
| 2013/0232958 A1 | 9/2013 | Ancimer et al. |
| 2013/0289857 A1 | 10/2013 | Schmitt et al. |
| 2014/0052353 A1 | 2/2014 | Sujan et al. |
| 2014/0056789 A1 | 2/2014 | Mussmann et al. |
| 2014/0229010 A1 | 8/2014 | Farquharson et al. |
| 2015/0020506 A1 | 1/2015 | Johansen |
| 2015/0023853 A1 | 1/2015 | Wittrock et al. |
| 2015/0033715 A1 | 2/2015 | Markatou et al. |
| 2015/0131093 A1 | 5/2015 | Saptari |
| 2015/0143798 A1 | 5/2015 | Lee |
| 2015/0204226 A1 | 7/2015 | Moore |
| 2015/0231564 A1 | 8/2015 | Wittrock et al. |
| 2015/0231565 A1 | 8/2015 | Wittrock et al. |
| 2015/0337702 A1* | 11/2015 | Ettireddy ............ B01D 53/9477 60/297 |
| 2016/0201533 A1 | 7/2016 | Upadhyay et al. |

FOREIGN PATENT DOCUMENTS

| | | | |
|---|---|---|---|
| DE | 102008026191 A1 | 1/2009 | |
| DE | 102009049521 A1 | 7/2010 | |
| DE | 102009038835 A1 | 3/2011 | |
| DE | 102010050312 A1 | 5/2012 | |
| DE | 102012201809 A1 | 9/2012 | |
| DE | 102014019427 A1 | 8/2015 | |
| DE | 102015015260 A1 | 6/2017 | |
| EP | 1181531 A1 | 2/2002 | |
| EP | 2390480 A1 | 11/2011 | |
| EP | 2 382 031 B1 * | 5/2017 | ......... B01D 53/9418 |
| FR | 2956039 A1 | 8/2011 | |
| KR | 20140143145 | 12/2014 | |
| WO | 2006008625 A1 | 1/2006 | |
| WO | 2007104382 A1 | 9/2007 | |
| WO | 2007145548 A1 | 12/2007 | |
| WO | 2009017597 A1 | 2/2009 | |
| WO | 2009017639 A1 | 2/2009 | |
| WO | 2011102781 A1 | 8/2011 | |
| WO | 2011133092 A1 | 10/2011 | |
| WO | 2012037342 A1 | 3/2012 | |
| WO | 2013022516 A1 | 2/2013 | |
| WO | 2013095214 A1 | 6/2013 | |
| WO | 2013100846 A1 | 7/2013 | |
| WO | 2014014399 A1 | 1/2014 | |
| WO | WO 2014 016616 A1 * | 1/2014 | ............. F01N 3/208 |
| WO | 2014044318 A1 | 3/2014 | |
| WO | 2014149297 A1 | 9/2014 | |
| WO | 2015048099 A1 | 4/2015 | |

OTHER PUBLICATIONS

NOx Controls; EPA/452/B-02-001 Section 4—Retrieved online on Jun. 5, 2015 from http://www.epa.gov/ttncatc1/dir1/cs4-2ch2.pdf; pp. 2-6, third paragraph.
International Search Report for PCT/SE2016/050794 dated Oct. 20, 2016.
Written Opinion of the International Searching Authority for PCT/SE2016/050794 dated Oct. 20, 2016.
Supplementary European Search Report for European Patent Application No. EP16839705 dated Jan. 3, 2019.
European Search Report for European Patent Application No. EP16839705 dated Jan. 10, 2019.

* cited by examiner

METHOD AND SYSTEM FOR A FIRST AND A SECOND SUPPLY OF ADDITIVE TO AN EXHAUST GAS STREAM FROM AN INTERNAL COMBUSTION ENGINE

CROSS-REFERENCE TO RELATED APPLICATION(S)

This application is a national stage application (filed under 35 § U.S.C. 371) of PCT/SE2016/050794, filed Aug. 25, 2016 of the same title, which, in turn claims priority to Swedish Application No. 1551111-6, filed Aug. 27, 2015 of the same title; the contents of each of which are hereby incorporated by reference.

FIELD OF THE INVENTION

The present invention relates to a method, an exhaust treatment system, and a computer program product for treatment of an exhaust stream.

BACKGROUND OF THE INVENTION

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in for example vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on, for example, the combustion concept, combustion strategies and/or fuel types which are used in the vehicles, and/or the types of compounds to be reduced in the exhaust stream. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammoniac $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency. Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides $NO_x$ is then carried out in the exhaust treatment system, which thus may also comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

SUMMARY OF THE INVENTION

To a certain extent, the performance of the exhaust treatment may be improved by increasing the substrate volumes comprised in the exhaust treatment systems. In particular, the losses due to an uneven distribution of the exhaust flow may be reduced. However, larger substrate volumes result in a direct impact on the cost of manufacture and/or production. A larger substrate volume also results in a greater back pressure, which counteracts potential gains in fuel consumption, due to the higher conversion degree caused by the increased volume. It is thus important to be able to use the exhaust treatment system optimally, for example by avoiding over-sizing and/or by limiting the exhaust treatment system's spread in terms of size and/or manufacturing cost.

Prior art exhaust treatment systems often have problems relating to inadequate soot oxidation in the filter arranged in the system to catch and oxidize soot particles, for example, a particulate filter DPF, an at least partly coated particulate filter cDPF, or a catalytic filter SCRF. These problems depend at least partly on the fact that the reactions which are comprised in the reduction of nitrogen oxides $NO_x$ are faster than the reactions comprised in the soot oxidation.

Overall, this means that it is difficult to find a solution to achieve both an optimized fuel consumption, and an efficient exhaust treatment. This means that it becomes very important to be able to use the system in as optimal a manner as possible, with respect to both fuel consumption and exhaust treatment. There is accordingly a need for an optimization of the function in exhaust treatment systems.

Therefore, one objective of the present invention is to provide a method and a system, which may provide an optimization of the function of the exhaust treatment system and thus a high performance, and a good function, under varying conditions.

According to the present invention a method and an exhaust treatment system are thus provided for treatment of an exhaust stream, which results from a combustion in a combustion engine. The exhaust stream comprises among others nitrogen oxides $NO_x$, including at least nitrogen monoxide NO and nitrogen dioxide $NO_2$.

The method comprises an estimate of at least one future operating condition for the exhaust treatment system, wherein such estimate is based on a representation of a road section ahead of the vehicle.

A first supply of a first additive into the exhaust stream is carried out, wherein such first additive is used at least at a first reduction of a first amount of nitrogen oxides $NO_{x\_1}$ in the exhaust stream in a first reduction catalyst device in the exhaust treatment system. This first supply may be controlled based on the estimated at least one future operating condition.

A second supply of a second additive into the exhaust stream is carried out, wherein the second additive is used at a second reduction of a second amount of nitrogen oxides $NO_{x\_2}$ in the exhaust stream in a second reduction catalyst device, arranged downstream of the first reduction catalyst device. This second supply may also be controlled based on the estimated at least one future operating condition.

According to the present invention, the first supply of additive is controlled based on the estimated at least one future operating condition in such a manner, that the first reduction catalyst device is exposed, over time, to a substoichiometric condition with respect to the first additive and the first amount of nitrogen oxides $NO_{x\_1}$. According to one embodiment of the present invention, the second supply of additive may also be controlled based on the estimated at least one future operating condition.

The present invention thus provides an active control of the first reduction, by way of an active control of a first administration of a first additive with a first dosage device, and an active control of the second reduction, by way of an active control of a second administration of a second additive with a second dosage device.

According to the present invention, the active control of the first supply of the first additive and/or the second supply of the second additive is based on the estimated at least one future operating condition, which in turn is based on information about the road section ahead. Thus, according to the present invention an estimate of the future operating conditions may be made. Since the system knows what the operating conditions will be like in the future, the first and/or second administration may be optimized according to such future operating conditions. This means that it becomes possible to administer the first additive proactively, that is to say to administer it in advance, for an operating condition that the system has predicted will arise. In other words, the supply of additive may, for example, increase temporarily ahead of an uphill slope, after a downhill slope, or at similar increased power outputs to proactively (in advance) meet the predicted future requirement.

It also becomes possible to administer the first additive in such a manner, that the first reduction catalyst device, over time, that is to say on average, is exposed to a substoichiometric condition in a controlled manner with respect to the first additive and the first amount of nitrogen oxides $NO_{x\_1}$. This is possible since the system, based on the estimated future operating conditions, will be able to predict when administration giving a stoichiometric or overstoichiometric condition, with respect to the first additive and to the first amount of nitrogen oxides $NO_{x\_1}$ for the first reduction catalyst device, will be required at certain special operating conditions.

The ability to administer additive in this manner, that is to say with a relatively low coverage over time, is also facilitated by the use of two reducing steps, the first reduction in the first reduction catalyst device and the second reduction in the second reduction catalyst device. With the use of the two reducing steps, the first reduction need not remove all nitrogen oxides $NO_x$, since the second reduction may eliminate the residue of nitrogen oxides $NO_x$ in the exhaust stream before it is emitted into the atmosphere. Accordingly, the first and/or second supply of additive may be controlled in such a manner, that the first reduction and the second reduction combined result in a required/desired/requested total catalytic function, so that a desired conversion degree of nitrogen oxides $NO_x$ is obtained for the exhaust treatment system. The use of the active control of the administration according to the present invention results in unexpectedly great advantages for a system with two reducing steps, since the substoichiometric condition at the first reduction in this case may be maintained over relatively long periods, while simultaneously a high performance may be achieved by way of a symbiotic use of the two reducing steps.

However, the substoichiometric condition must be interrupted at certain special operating modes/operating conditions for an acceptable exhaust purification to be provided. Thanks to the estimate of the future operating conditions, carried out according to the present invention, these special operating conditions may be identified in advance, that is to say before they occur, so that the active administration of additive may be adjusted very accurately, both with regard to timing and amount, to meet the requirements in these special operating conditions. Thus, the information about the road section ahead is used to optimize the active control of the supply of the first and/or the second additive, in order to provide precise and balanced administration before and/or at the special operating conditions. Since such a good control over the special operating conditions, and corresponding adjustments of the administration, may be obtained when the present invention is used, a relatively low supply of the first additive over time may also be carried out. In other words, low values for an ammonia/nitrogen oxides ratio (ANR; Ammonia to $No_x$ ratio) over time may be used for the first reduction catalyst device in periods between the special operating conditions. This entails, among others, that a sufficient $NO_2$-based soot oxidation may occur in the filter that is arranged in the exhaust treatment system to catch and oxidize soot particles, such as a particulate filter DPF, an at least partly coated particulate filter cDPF, or a catalytic filter SCRF. As a result, the soot oxidation in the filter may be kept under control.

Thus, according to the present invention, the first supply of the first dosage substance is controlled in such a manner, that a relatively small amount of additive is administered over time, which means that not all nitrogen dioxide $NO_2$ available in the exhaust stream is consumed at the reduction of nitrogen oxides $NO_x$ in the first reduction catalyst device. In other words, the first supply of the first additive is controlled in such a manner, that nitrogen dioxide $NO_2$ is normally available for soot oxidation in the filter.

As mentioned above, the use of the first supply of additive and the first reduction catalyst device in combination with a second supply of a second additive and the second reduction catalyst device facilitates this under-administration of the first additive. The double possibility of a reduction of nitrogen oxides, in the first reduction catalyst device as well as in the second reduction catalyst device, means that not all nitrogen dioxide $NO_2$ must be eliminated continuously in the first reduction catalyst device. The excess nitrogen dioxide $NO_2$ may be used to oxidize the soot that has been stored in the filter.

The configuration of the exhaust treatment system according to the present invention thus facilitates, thanks to its double possibility of a reduction of nitrogen oxides $NO_x$, an improved soot oxidation in the catalytic filter SCRF. This ensures that a sufficient $NO_2$-based soot oxidation is obtained.

According to one embodiment of the present invention, the administration may also be carried out based on the future operating conditions, so that the fill/coverage degree of additive for the first and/or second reduction catalyst device is maximized without slip/residue of additive arising downstream of the first and second reduction catalyst device, respectively.

Additionally, according to certain embodiments of the invention, an active control of an exhaust environment comprising, for example, a temperature for the exhaust stream at the first reduction catalyst device, may be carried out based on the estimated future operating conditions. The exhaust environment may here, for example, be oxidizing, with good access to air, or it may be reducing, with poorer access to air. Fuel injection into the engine may thus be used to impact the exhaust environment.

The active control of the temperature may, according to different embodiments of the present invention, be controlled by adjusting the air/fuel-ratio (the lambda value) in the combustion engine, wherein a reduced air flow increases the temperature, and an increased air flow reduces the temperature. The air/fuel ratio may, for example, be changed by changing the combustion mode of the engine.

The air flow through, and accordingly also the temperature for, the exhaust treatment system may also be controlled by controlling a gearbox in the vehicle based on the future operating conditions, since the use of different gears results in different air flows through the exhaust treatment system.

The present invention provides, according to one embodiment, a control of a ratio $NO_2/NO_x$, between the amount of nitrogen dioxide $NO_2$ and the amount of nitrogen oxides $NO_x$ in the exhaust stream, based on the future operating conditions. Thus, for example, too high values for this ratio may be avoided through the active control, wherein for example $NO_2/NO_x > 50\%$ may be avoided, since the value for the ratio may be actively controlled to be reduced. The value for the ratio $NO_2/NO_x$ may also be increased when the value is too low, for example if $NO_2/NO_x < 50\%$.

The present invention also has an advantage in that two cooperating dosage devices are used in combination for the dosage of a reductant, for example urea, upstream of the first and second reduction catalyst devices, which relieves and facilitates mixture and potential evaporation of the reductant, since the injection of the reductant is divided between two physically separate positions. This reduces the risk of the reductant cooling down the exhaust treatment system locally, which may potentially form deposits at the positions where the reductant is injected, or downstream of such positions.

BRIEF DESCRIPTION OF THE DRAWINGS

The invention will be illustrated in more detail below, along with the enclosed drawings, where similar references are used for similar parts, and where.

DETAILED DESCRIPTION OF THE INVENTION

Figure 1:
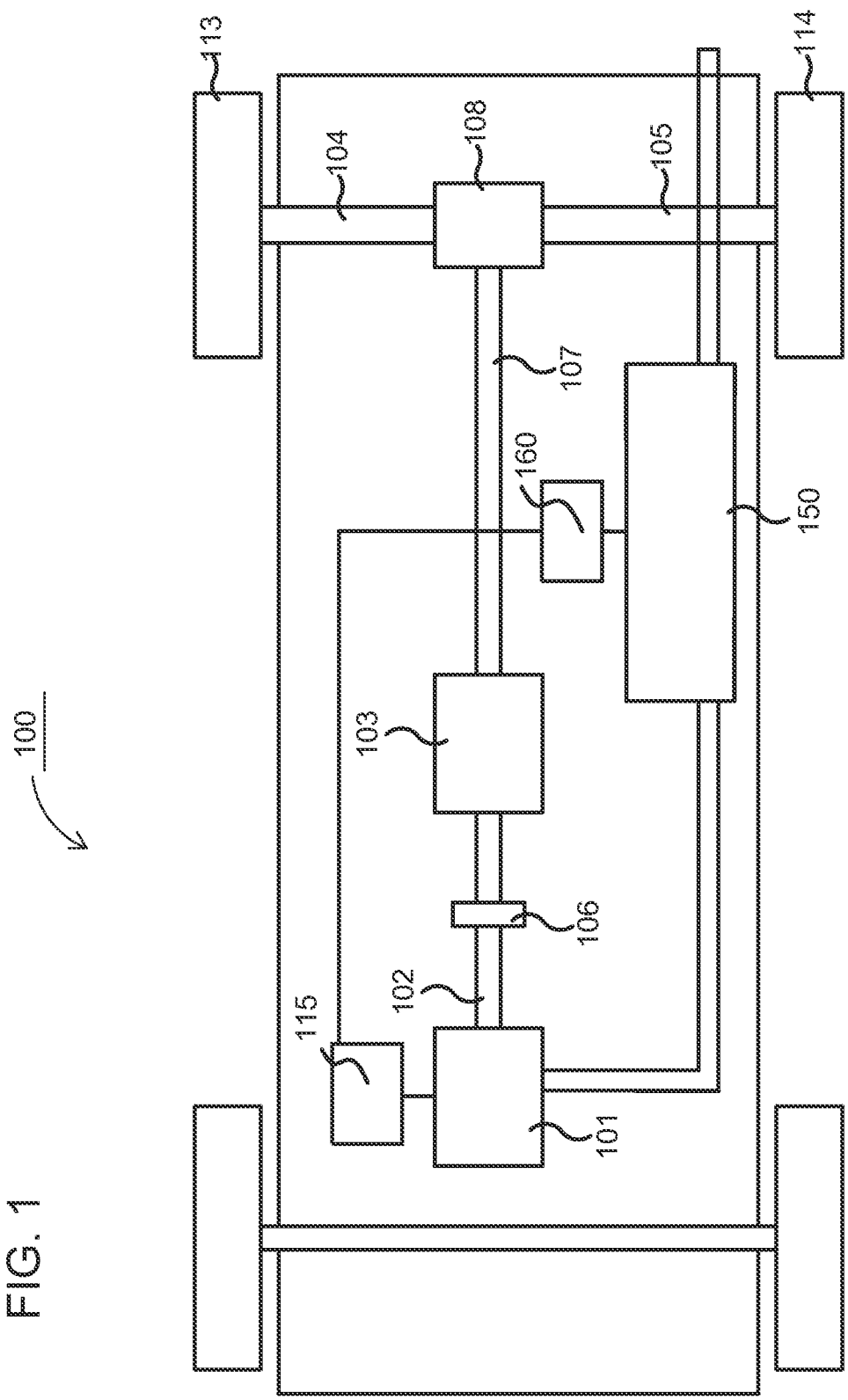
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the vehicle's control system via a control device 115. Likewise, the clutch 106 and the gearbox 103 may be controlled by the vehicle's control system, with the help of one or more applicable control devices (not shown). Naturally, the vehicle's power-train may also be of another type, such as a type with a conventional automatic gearbox, of a type with a hybrid power-train, etc.

An output shaft 107 from the gearbox 103 drives the wheels 113, 114 via a final drive 108, such as e.g. a customary differential, and the drive shafts 104, 105 connected to said final drive 108.

The vehicle 100 also comprises an exhaust treatment system/exhaust purification system 150 for treatment/purification of exhaust emissions resulting from combustion in the combustion chambers, which may consist of cylinders, of the combustion engine 101. The exhaust treatment system 150 may be controlled by the vehicle's control system via a control device 160, which may also be connected to the engine, and/or to an engine control device 115.

Figure 2:
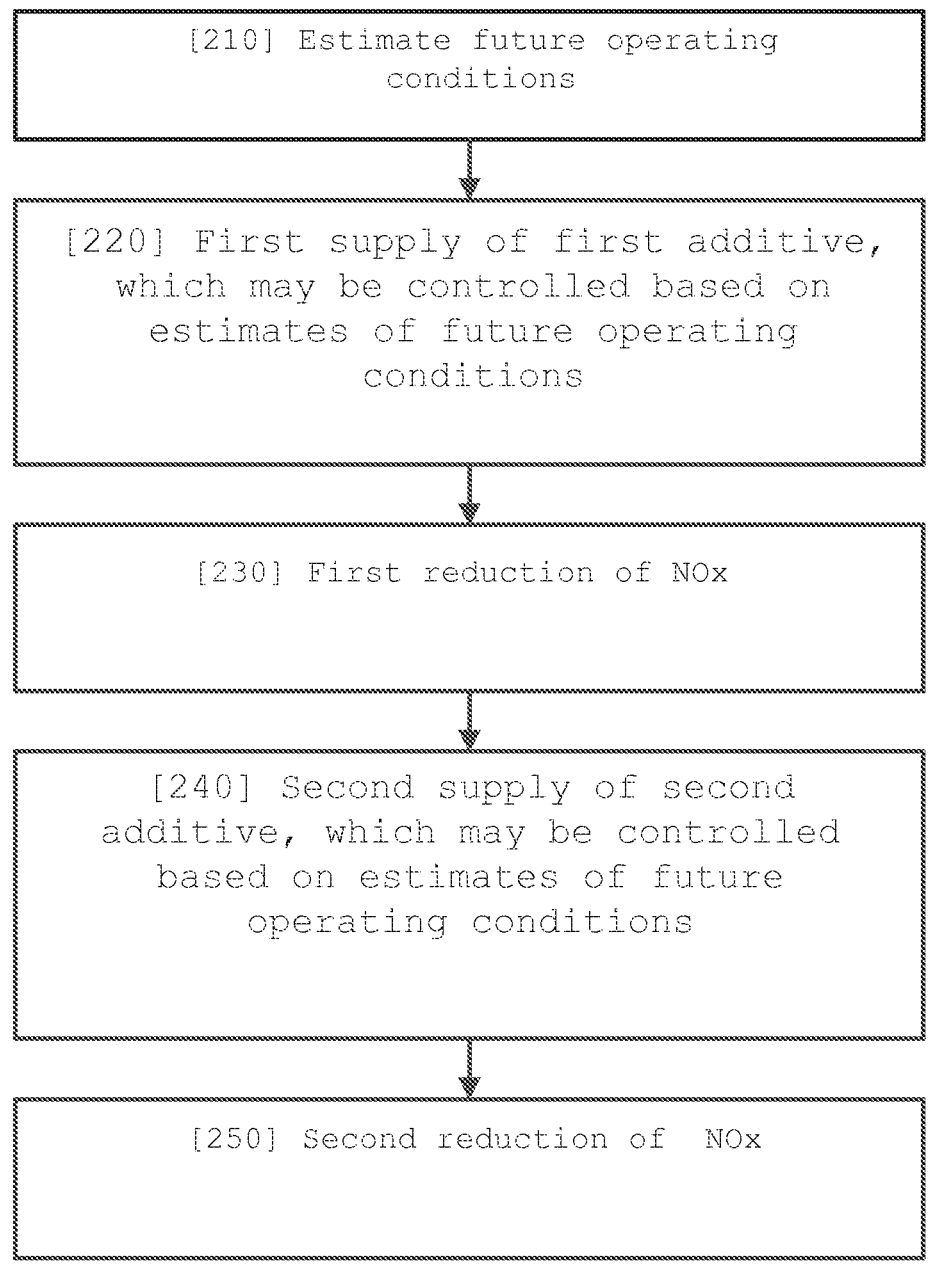
FIG. 2 shows a flow chart for the method for exhaust treatment according to the invention.

According to the present invention, a method is provided for the treatment of an exhaust stream, which results from a combustion in a combustion engine and comprises nitrogen oxides $NO_x$. As mentioned above, nitrogen oxides $NO_x$ comprise nitrogen monoxide NO and nitrogen dioxide $NO_2$. This method may be illustrated with the flow chart in FIG. 2.

In a first step 210 of the method, at least one future operating condition for the exhaust treatment system is estimated based on a representation of a road section ahead of the vehicle 100.

In a second step 220 of the method, a first supply of a first additive into the exhaust stream is carried out, wherein such additive is used at least in a third step 230 at a first reduction of a first amount of nitrogen oxides $NO_{x\_1}$ in the exhaust stream, in a first reduction catalyst device in the exhaust treatment system. This first supply may be controlled based on the estimated at least one future operating condition.

In a fourth step 240 of the method, a second supply of a second additive into the exhaust stream is carried out, wherein the additive is used in a fifth step 250 at a second reduction of a second amount of nitrogen oxides $NO_{x\_2}$ in the exhaust stream, in a second reduction catalyst device, arranged downstream of the first reduction catalyst device. This second supply of additive may, according to one embodiment, also be controlled based on the estimated at least one future operating condition.

According to the present invention, the first supply of additive is controlled based on the estimated at least one future operating condition in such a manner, that the first reduction catalyst device is exposed, over time, to a substoichiometric condition with respect to the first additive and the first amount of nitrogen oxides $NO_{x\_1}$. The second supply of additive may also be controlled based on the estimated at least one future operating condition in such a manner, that a required total catalytic function in the exhaust treatment system may be secured.

This active control of the first and/or second supply of the first and/or second additive is carried out, according to one embodiment of the present invention, so that a sufficient $NO_2$-based soot oxidation may occur in a filter in the exhaust treatment system, which means that soot oxidation in the filter may be kept under control. This is achieved since the first supply of the first additive over time is relatively minor, that is to say that less additive is supplied than what would be required to eliminate all nitrogen dioxide $NO_2$ in the first reduction catalyst device.

The soot oxidation is improved, according to the present invention, by the possibility of controlling the system with a lower average stoichiometry for the first reduction catalyst device.

According to one embodiment of the present invention, the substoichiometric condition over time, with respect to the first additive and to the first amount of nitrogen oxides $NO_{x\_1}$, corresponds to an ammonia/nitrogen oxides ratio (ANR; Ammonia to $No_x$ ratio) over time with a value below 1, that is to say ANR<1. In other words, with the use of the present invention on average a smaller amount of first additive is supplied over time, than what would have been required to eliminate all nitrogen dioxide $NO_2$ in the exhaust stream in the first reduction catalyst device. For the exhaust treatment system according to the present invention, such an under-administration is, however, possible, since a second supply of a second additive, and a second reduction catalyst device, is arranged downstream of the first reduction catalyst device in the exhaust treatment system. The double possibility of a reduction of nitrogen oxides, in the first as well as the second reduction catalyst devices, means that not all nitrogen dioxide $NO_2$ needs to be eliminated in the first reduction catalyst device, as long as the residue of nitrogen dioxide $NO_2$ may be reduced in the second reduction catalyst device arranged downstream. The excess of nitrogen dioxide $NO_2$ in the filter may then be used to oxidize the soot stored therein. It is noted that for prior art exhaust treatment systems, such as, for example, a Euro VI-system, such an under-administration of additive would be completely impossible to carry out, since the unreduced amount of nitrogen dioxide would then be emitted into the atmosphere.

According to various embodiments of the present invention, the supply of the first and/or second additive is controlled in such a manner, that an ANR-ratio over time for the first reduction catalyst device corresponds to ANR<0.5; ANR<0.6; ANR<0.7; or ANR<0.8.

The value for the ANR-ratio over time may, according to one embodiment, depend on one or several characteristics of the first reduction catalyst device, such as, for example, on one or several catalytic characteristics, a catalyst type, a temperature interval, within which the first reduction catalyst device is active, and/or a coverage degree of ammonia for the first reduction catalyst device.

According to one embodiment of the present invention, the control of the first supply 220 of the first additive is carried out in such a manner, that the first reduction catalyst device is exposed to the substoichiometric ANR-ratio except under certain time-limited special operating conditions for the combustion engine. In other words, the first reduction catalyst device is exposed to substoichiometric conditions during most of the operation, but the control also allows the first reduction catalyst device to be exposed to stoichiometric and/or overstoichiometric conditions for certain well-defined and brief time periods. When an average value for the ANR-ratio over time is determined, such a control results in a substoichiometric ANR-ratio over time, since the time periods when the substoichiometric ANR-conditions prevail are significantly longer than the time-limited special operating conditions.

The time-limited special operating conditions are so limited in time that an accumulation of soot in a filter in the exhaust treatment system, such as a non-coated or coated particulate filter DPF/cDPF or a catalytic filter SCRF, exceeding a soot threshold value $S_{th}$, may be avoided. This is possible since nitrogen dioxide $NO_2$, which may be used to facilitate an oxidation of soot particles in the filter DPF/cDPF/SCRF, is available in the filter, except when said time-limited special operating conditions prevail.

The time-limited special operating conditions may, for example, comprise transient operating conditions for the combustion engine, which may, for example, occur in connection with increased power output and/or cold start. For such time-limited special operating conditions, the first reduction 230 of the first amount of nitrogen oxides $NO_{x\_1}$ may be given a higher priority than an oxidation of soot particles in the exhaust treatment system. According to one embodiment, the time-limited operating conditions in connection with the transient operating conditions, increased power output and/or cold start, comprise a time period just before the transient operating conditions, increased power output and/or cold start occur, which means that the administration of additive may be carried out proactively to meet the future requirement. The time period just before the transient operating conditions, the increased power output and/or the cold start occurs may here have a duration that facilitates that proactive administration being completed before the transient operating conditions, the increased power output and/or the cold start occurs.

Thus, the nitrogen dioxide $NO_2$ in the catalytic filter may be allowed to decrease in the filter, for example, in connection with an acceleration, an uphill slope or other similar time-limited operating conditions. Likewise, the nitrogen dioxide $NO_2$ in the catalytic filter may be allowed to decrease in the filter during time-limited periods in connection with cold starts.

According to one embodiment of the present invention, the first supply 220 of the first additive and/or the second supply 240 of the second additive is controlled to increase to a level, at which there is a risk that precipitates of additive may arise, for example, residues in the form of lumps of urea.

The first supply 220 of the first additive and/or the second supply 240 of the second additive is controlled to decrease, following which residues of the first and/or second additive may be eliminated by heat in the exhaust stream. According to one embodiment, this decrease of the supply is equivalent to an interruption in the supply, during which no additive is supplied to the exhaust stream by the first and/or second dosage device. The decrease of the first and/or second supply is here carried out only if a required/desired/requested total catalytic function for the exhaust treatment system may be provided after the decrease of the first and/or second supply. This ensures that a required/desired/requested amount/level of nitrogen oxides $NO_x$ is emitted from the exhaust treatment system. Catalytic function, as used herein, means a function equivalent to a conversion degree of, for example, nitrogen oxides $NO_x$. The required catalytic function may here depend on current measured, modelled and/or predicted operating conditions, based on, for example, information about the road section ahead, regarding the combustion engine, the exhaust stream and/or the exhaust treatment system. Thus, residues of nitrogen oxides and/or additive may be eliminated in a safe and controlled manner.

A required impact/reduction/catalytic function referred to herein may be related to a maximum allowed emission of nitrogen oxides $NO_x$, which may be based on, for example, emission requirements in the Euro VI emission standard or in other existing and/or future emission standards.

With the use of this embodiment a greater supply of additive may, for example, be permitted, since the potential precipitates/residues may naturally be heated away while the emission requirements are met by the exhaust treatment system overall. The individual first and second reduction catalyst devices need not be set up to cope, individually and in all operating modes, with a shut-down of one of the dosage devices, since the intelligent control of the supply of additive only carries out the decrease when it still provides acceptable performance for the exhaust treatment system.

As described above, at least one future operating condition is estimated 210 for the exhaust treatment system, based on a representation of a road section ahead of the vehicle 100. This representation comprises information related to the road section ahead, such as, for example, relating to a topography, a curvature, a traffic situation, a traffic intensity, road works, a road condition and/or a speed limit for the road section. The information relating to the road section ahead may also comprise information on the weather on the road section, such as information on wind, temperature and/or rain/snow. The estimate 210 may, for example, be carried out at different times, such as every second, and over a road section with a predetermined length/horizon. Thus, the method according to the present invention may base the control of the first and/or second supply of additive on current values, so that a very accurate control of the supply may be provided.

The information on the road section ahead, on which the estimate is based, may for example be obtained with positioning information, such as, for example, GPS-information (Global Positioning System-information), information obtained from one or more of GNSS (Global Navigation Satellite System), GLONASS, Galileo and Compass, or information obtained from a relative positioning system using optical sensors, map information and/or topographical information, weather reports, information communicated between different vehicles and information communicated via wireless communication, such as for example radio. Information about vehicles ahead may also be comprised in the knowledge about the road section ahead, so that, for example, radar and/or camera equipment may be used to determine the information about road sections ahead and the position of the own vehicle.

The estimate 210 of future operating conditions may, according to various embodiments described below, comprise estimates of one or more operating conditions for the exhaust treatment system relating to parameters such as, for example, temperature, conversion degree, mass flow, soot accumulation, coverage degree of additive, residues of additive, and the carbon dioxide level in the exhaust stream/exhaust treatment system, as well as relating to the power output from the engine. The control of the first and/or second supply of additive may then be based on these estimated operating conditions, in order to optimize the administration of additive into the exhaust stream.

According to one embodiment of the present invention, at least one future temperature for the first reduction catalyst device and/or the second reduction catalyst device is estimated for the road section ahead.

According to one embodiment of the present invention, at least one future conversion degree of additive for the first reduction catalyst device and/or the second reduction catalyst device is estimated for the road section ahead.

According to one embodiment of the present invention, at least one future mass flow for the exhaust stream through the exhaust treatment system is estimated for the road section ahead.

According to one embodiment of the present invention, at least one future soot accumulation in a particulate filter DPF/cDPF, arranged downstream of the first reduction catalyst device in the exhaust treatment system, is also estimated for the road section ahead. Normally, the soot in the particulate filter DPF/cDPF accumulates over time, wherein such time is often relatively long. At certain operating conditions soot may, however, build up faster, that is to say that the accumulation time is relatively short.

According to one embodiment of the present invention, the first reduction catalyst device comprises a catalytic filter SCRF, wherein the catalytic filter SCRF comprises an at least partly catalytic coating with reduction characteristics. Here, at least one future soot accumulation in the catalytic filter SCRF is estimated for the road section ahead. Also, the soot in the catalytic filter SCRF accumulates over time, so that the length of this duration may depend on current operating conditions.

According to one embodiment of the present invention, at least one future coverage degree of additive for the first reduction catalyst device and/or the second reduction catalyst device is estimated for the road section ahead.

According to one embodiment of the present invention, at least one future residue of additive for the first reduction catalyst device and/or the second reduction catalyst device is estimated for the road section ahead.

According to one embodiment of the present invention, the first reduction 230 is preceded by a first oxidation of compounds comprising one or more of nitrogen, carbon and hydrogen in the exhaust stream. Here, at least one future value $(NO_{2\_1}/NO_{x\_1})_{est}$ is estimated for a ratio between a first amount of nitrogen dioxide $NO_{2\_1}$ and a first amount of nitrogen oxides $NO_{x\_1}$, reaching the first reduction catalyst device in the road section ahead. According to one embodiment of the present invention, the first supply 220 of the first additive is also controlled based on a future distribution of the quota between nitrogen dioxide and nitrogen oxides $NO_{2\_1}/NO_{x\_1}$, that is to say, for example, based on the estimated value $(NO_{2\_1}/NO_{x\_1})_{est}$ for this first ratio. The first supply 220 of the first additive may here be controlled based on an estimated value $(NO_{2\_1}/NO_{x\_1})_{est}$ for the first ratio in such a manner, that the reduction in the first and/or second reduction catalyst device occurs, to as great an extent as possible, via reaction paths over both nitrogen oxides NO and nitrogen dioxide $NO_2$.

According to one embodiment of the present invention, the second reduction 250 is preceded by a second oxidation of compounds comprising one or more of nitrogen, carbon and hydrogen in the exhaust stream. Here, the at least one future value $(NO_{2\_2}/NO_{x\_2})_{est}$ for a ratio between a second amount of nitrogen dioxide $NO_{2\_2}$ and a second amount of nitrogen oxides $NO_{x\_2}$, reaching the second reduction catalyst device in the road section ahead, is estimated. A second amount of nitrogen oxides $NO_{x\_2}$ reaching the reduction catalyst device may, according to one embodiment, correspond to a second ratio $NO_{2\_2}/NO_{x\_2}$, between a second amount of nitrogen dioxide $NO_{2\_2}$ and a second amount of nitrogen oxides $NO_{x\_2}$ reaching the reduction catalyst device. A value $(NO_{2\_2}/NO_{x\_2})_{est}$ may here be estimated for this second ratio $NO_{2\_2}/NO_{x\_2}$, for example, based on information on the road section ahead. According to one embodiment of the present invention, the first supply 220 of the first additive is also controlled based on this estimated value $(NO_{2\_2}/NO_{x\_2})_{est}$. This active control of the first supply 220 may here achieve a decrease of a value $NO_{2\_2}/NO_{x\_2}$ for this second ratio, since the second amount of nitrogen oxides $NO_{x\_2}$ reaching the second device increases. This may be achieved by way of implementing the active control of the first supply in such a manner, that the first supply decreases, wherein the first reduction of the first amount of nitrogen oxides $NO_{x\_1}$ in the catalytic filter decreases.

According to one embodiment of the present invention, at least one future power output for the combustion engine is estimated, wherein future operating conditions are estimated based on this estimated power output in the road section ahead.

According to various embodiments of the present invention, the method thus comprises a first and/or a second oxidation of compounds comprising one or more of nitrogen, carbon and hydrogen in the exhaust stream. The first oxidation may be carried out by a first oxidation catalyst, arranged upstream the first dosage device. The second oxidation may, according to one embodiment, be carried out by a second oxidation catalyst, arranged downstream of a catalytic filter. The second oxidation may also, according to another embodiment, be carried out by the at least partly catalytic coating, which is comprised in the catalytic filter, wherein the catalytic coating then, apart from its reduction characteristics, also has oxidation characteristics.

The first oxidation catalyst and/or the second oxidation catalyst may create heat for components fitted downstream in the exhaust treatment system, such as for a filter and/or for a reduction catalyst device.

According to one embodiment of the present invention, the combustion engine is controlled to generate heat proactively, which may be used to heat at least one of the first oxidation catalyst and the first reduction catalyst device. Thus, the first reduction catalyst device may reach a desirable predetermined performance for a future conversion of nitrogen oxides $NO_x$, since the conversion of nitrogen oxides $NO_x$ is dependent on the temperature.

According to different embodiments of the present invention, the control 220 of the first supply 220 of the first additive may be carried out based also on one or several characteristics and/or operating conditions for one or more of the first and the second reduction catalyst device.

Similarly, the control 240 of the second supply of the second additive may be carried out based also on one or more characteristics and/or operating conditions for one or more of the first and second reduction catalyst device.

These characteristics for the reduction catalyst devices may be related to catalytic reduction characteristics for the first, and/or the second reduction catalyst device, a catalyst type for the first and/or the second reduction catalyst device, a temperature interval, within which the first and/or the second reduction catalyst device is active, and/or a coverage of ammonia for the first and/or the second reduction catalyst device.

The above operating conditions for the respective reduction catalyst devices may be related to a temperature for the reduction catalyst device and/or a temperature trend for the reduction catalyst device.

According to one embodiment of the present invention, an adjustment is carried out, when needed, of the first ratio $NO_{2\_1}/NO_{x\_1}$ between the first amount of nitrogen dioxide $NO_{2\_1}$ and the first amount of nitrogen oxides $NO_{x\_1}$ reaching the first reduction catalyst, since an active control of this first amount of nitrogen oxides $NO_{x\_1}$ is carried out with engine and/or combustion measures. Accordingly, the first amount of nitrogen oxides $NO_{x\_1}$ is here impacted by an active control of the combustion engine, in order to give the first ratio $NO_{2\_1}/NO_{x\_1}$ a suitable value based, for example, on an estimated future value $(NO_{2\_1}/NO_{x\_1})_{est}$ for this first ratio. Here the combustion engine may thus be controlled to alter the amount of nitrogen oxides $NO_{x\_1}$ emitted by it, if the estimated value $(NO_{2\_1}/NO_{x\_1})est$ for the ratio is not optimal. The value that is considered to be optimal depends on the objective of the active control of the combustion parameters. Such an objective may be to achieve an effective soot oxidation in the catalytic filter. Another objective may be to achieve an effective reduction of nitrogen oxides in the catalytic filter.

A person skilled in the art will realize that a method for treatment of an exhaust stream according to the present invention may also be implemented in a computer program, which when executed in a computer will cause the computer to execute the method. The computer program usually consists of a part of a computer program product 403, wherein the computer program product comprises a suitable non-volatile/permanent/persistent/durable digital storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
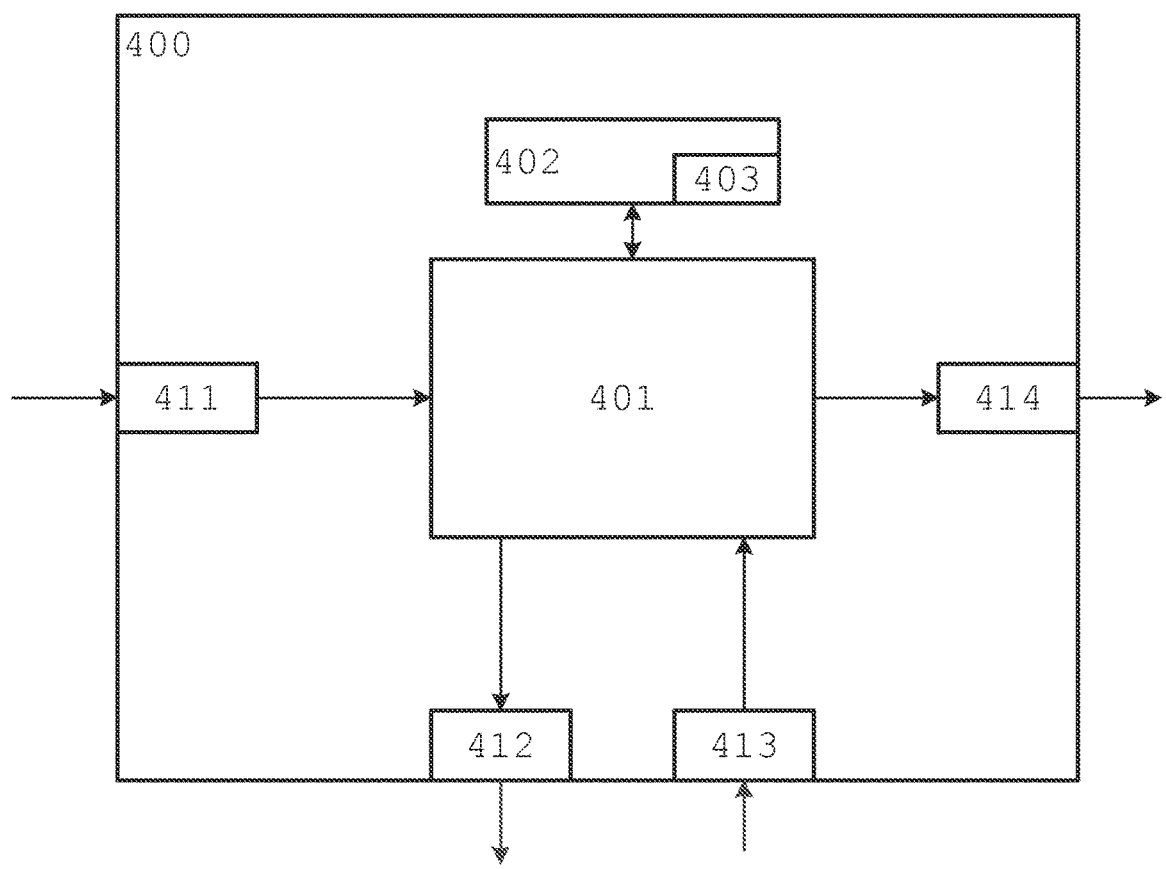
FIG. 4 shows a control device, in which a method according to the present invention may be implemented.

FIG. 4 schematically shows a control device 400. The control device 400 comprises a calculation device 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code, and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals, respectively. These input and output signals may contain wave shapes, pulses or other attributes, which may be detected as information by the devices 411, 413 for the receipt of input signals, and may be converted into signals that may be processed by the calculation device 401. These signals are then provided to the calculation device 401. The devices 412, 414 for sending output signals are arranged to convert the calculation result from the calculation unit 401 into output signals for transfer to other parts of the vehicle's control system, and/or the component(s) for which the signals are intended, for example the first and/or second dosage devices.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIG. 4, which is well known to a person skilled in the art within the technology area.

The present invention, in the embodiment displayed, is implemented in the control device 400. The invention may, however, also be implemented wholly or partly in one or several other control devices, already existing in the vehicle, or in a control device dedicated to the present invention.

Here, and in this document, devices are often described as being arranged to carry out steps in the method according to the invention. This also comprises that the units are adapted and/or set up to carry out these method steps, for example, these units may correspond to different groups of instructions, for example in the form of program code, which is fed into, and used by a processor, when the respective unit is active/used to implement the respective method steps.

Figure 3:
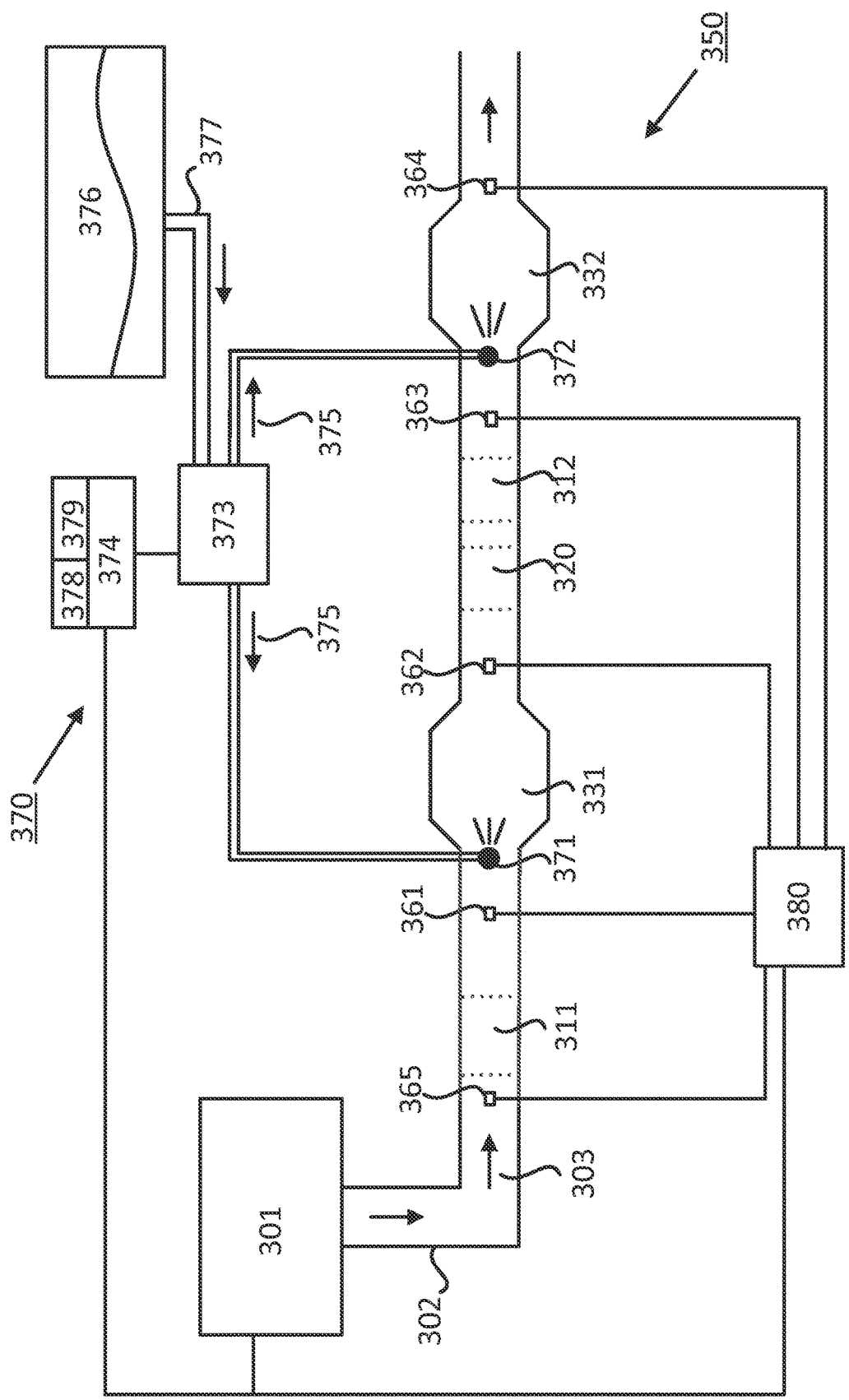
FIG. 3 shows an example of an exhaust treatment system according to one embodiment of the present invention.

FIG. 3 schematically shows an exhaust treatment system 350 according to one aspect of the present invention, which system is connected to a combustion engine 301 via an exhaust conduit 302. Exhausts generated at combustion in the engine 301, that is to say the exhaust stream 303 (indicated with arrows), are led past a first dosage device 371, arranged in the exhaust treatment system 350 in order to provide a first supply 220 of a first additive into the exhaust stream 303, before it reaches the first reduction catalyst device 331. The first additive supplied to the exhaust stream 303 at the first supply 220 is used at a first reduction 230 of a first amount of nitrogen oxides $NO_{x\_1}$ with the first reduction catalyst device 331.

According to one embodiment of the invention, a first hydrolysis catalyst, which may consist of substantially any suitable hydrolysis coating, and/or a first mixer, may be arranged in connection with the first dosage device 371. The first hydrolysis catalyst, and/or the first mixer, are then used to increase the speed of the decomposition of urea into ammonia, and/or to mix the additive with the emissions, and/or to vaporize the additive.

The first reduction catalyst device 331 is arranged downstream of the first dosage device 371 and may consist of one of:
- a first selective catalytic reduction catalyst $SCR_1$;
- a first selective catalytic reduction catalyst $SCR_1$, integrated downstream with a first slip-catalyst $SC_1$, wherein the first slip-catalyst $SC_1$ is arranged to oxidize a residue of additive, and/or to assist the first selective catalytic reduction catalyst $SCR_1$ with an additional reduction of nitrogen oxides $NO_x$ in the exhaust stream 303; and
- a first selective catalytic reduction catalyst $SCR_1$, followed downstream by a separate first slip-catalyst $SC_1$, wherein the first slip-catalyst $SC_1$ is arranged to oxidize a residue of additive, and/or to assist the first selective catalytic reduction catalyst $SCR_1$ with an additional reduction of nitrogen oxides $NO_x$ in the exhaust stream 303;
- a first slip-catalyst SC', arranged to oxidize a residue of additive and/or to carry out a reduction of nitrogen oxides $NO_x$ in said exhaust stream (303); and
- a catalytic filter SCRF, which consists of a particulate filter comprising an at least partly catalytic coating with reduction characteristics, which is arranged for catching and oxidizing of soot particles and to carry out a first reduction 230 of a first amount of nitrogen oxides $NO_{x\_1}$ reaching the catalytic filter 320.

The exhaust treatment system 350 also comprises a second dosage device 372, arranged downstream of the first reduction catalyst device 331, that is to say upstream of the second reduction catalyst device 332, in order to provide a second supply 240 of a second additive to the exhaust stream 303. The second additive, which is supplied to the exhaust stream by the second dosage device 372, is used during the second reduction 250 in the second reduction catalyst device 332.

The second reduction catalyst device 332 comprises one of:
- a second selective catalytic reduction catalyst $SCR_2$;
- a second selective catalytic reduction catalyst $SCR_2$, integrated downstream with a second slip-catalyst $SC_2$, wherein the second slip-catalyst $SC_2$ is arranged to oxidize a residue of additive, and/or to assist the second selective catalytic reduction catalyst $SCR_2$ with an additional reduction of nitrogen oxides $NO_x$ in the exhaust stream 303;
- a second selective catalytic reduction catalyst $SCR_2$, followed downstream by a second slip-catalyst $SC_2$, wherein the second slip-catalyst $SC_2$ is arranged to oxidize a residue of additive, and/or to assist the second selective catalytic reduction catalyst $SCR_2$ with an additional reduction of nitrogen oxides $NO_x$ in the exhaust stream 303; and
- a second slip-catalyst $SC_2$, arranged to oxidize a residue of additive and/or to carry out a reduction of nitrogen oxides $NO_x$ in the exhaust stream 303.

The exhaust treatment system 350 may, according to one embodiment of the present invention, comprises a particulate filter DPF 320, arranged downstream of the first reduction catalyst device 331 and upstream of the second reduction catalyst device 332, in order to catch and oxidize soot particles.

The exhaust treatment system 350, according to another embodiment of the present invention, may also comprise a particulate filter cDPF 320, at least partly comprising a catalytically oxidizing coating, which is arranged downstream of the first reduction catalyst device 331 and upstream of the second reduction catalyst device 332, and which is arranged to catch and oxidize soot particles and to oxidize one or more of nitrogen oxides NO and incompletely oxidized carbon compounds.

It may be noted, that when the first reduction catalyst device 331 according to the embodiment described above comprises a catalytic filter, according to one embodiment, no additional particulate filter DPF/cDPF 320 need be arranged in the exhaust treatment system 350, since the catalytic filter SCRF in this case catches and oxidizes the soot particles.

According to one embodiment, the exhaust treatment system 350 also comprises a first oxidation catalyst 311, arranged upstream of the first dosage device 371, in order to oxidize compounds comprising one or more of nitrogen, carbon, and hydrogen in the exhaust stream 303.

According to one embodiment, the exhaust treatment system 350 also comprises a second oxidation catalyst 312, which is arranged upstream of the second dosage device 372, in order to oxidize one or more of nitrogen oxides NO and incompletely oxidized carbon compounds in the exhaust stream 303. The second oxidation catalyst 312 is advantageously used in the exhaust treatment system when the filter 320 is a non-coated particulate filter DPF.

The first oxidation catalyst 311 and/or the second oxidation catalyst 312 is at least partly coated with a catalytically oxidizing coating, wherein this oxidizing coating may comprise at least one precious metal, such as platinum.

It may be noted that when the particulate filter 320 is at least partly coated with a catalytically oxidizing coating cDPF, according to one embodiment, no second oxidation catalyst 312 need be arranged in the exhaust treatment system 350.

The exhaust treatment system 350 according to the present invention also comprises a control device 380, arranged to estimate 210 at least one future operating condition for the exhaust treatment system 350 based on a representation of a road section ahead of the vehicle 100, as described above. The control device 380 is also arranged to control the first supply 220 of the first additive, based on the estimated at least one future operating condition in such a manner, that the first reduction catalyst device 331 is exposed, over time, to a substoichiometric condition with respect to the first additive and to the first amount of nitrogen oxides $NO_{x\_1}$, as described above. The control device may, according to one embodiment of the present invention, be arranged to also control the second supply 240, based on the estimated at least one future operating condition, whereby a required total catalytic function for the first and second reduction catalyst devices may be ensured.

The control device 380 is set up to estimate 210 at least one future operating condition for the exhaust treatment system, based on a representation of a road section ahead of the vehicle 100. This representation comprises information related to the road section ahead, such as, for example, relating to a topography, a curvature, a traffic situation, a traffic intensity, road works, a road condition, weather conditions and/or a speed limit for the road section.

The information on the road section ahead, on which the estimate is based, may for example be obtained with positioning information, or information obtained from a relative positioning system using optical sensors, map information and/or topography map information, weather reports, information communicated among different vehicles and information communicated via wireless communication such as radio. Information about vehicles ahead may also be comprised in the knowledge about the road section ahead, so that, for example, radar and/or camera equipment may be used to determine the information about road sections ahead and the position of the own vehicle.

The estimate 210 of future operating conditions may, according to various embodiments described above, comprise estimates of one or more operating conditions for the exhaust treatment system, relating to parameters such as, for example, temperature, conversion degree, mass flow, soot accumulation, coverage degree of additive, residues of additive, and the carbon dioxide level in the exhaust stream/exhaust treatment system, as well as relating to the power output from the engine. The control of the first and/or second supply of additive may then be based on these estimated operating conditions, in order to optimize the administration of additive into the exhaust stream.

The control device 380 is, as described above, set up to control the first supply 220 of the first additive in such a manner, that the first reduction catalyst device 331 is exposed to a substoichiometric condition, except under certain time-limited special operating conditions for the combustion engine 301. This means that, at normal operation of the vehicle/combustion engine, the oxidation of soot particles in the filter may be given a higher priority than the first reduction 230 of nitrogen oxides $NO_x$ when the exhaust treatment system according to the present invention is used, since an additional possible reduction of nitrogen oxides $NO_x$ is available in the system, in the form of the second reduction catalyst device downstream of the first reduction catalyst device.

The exhaust treatment system 350 also comprises, according to one embodiment, at least one dosage control device 374, arranged to control at least one of the first supply 220 and the second supply 240.

In other words, the dosage control device 374 controls one or several of the first dosage device 371 and the second dosage device 372, and/or pumps or similar devices, which supply these dosage devices 371, 372 with additive. According to one embodiment, this dosage is controlled in such a way that a sufficient amount of additive is supplied into the exhaust stream via the first dosage device 371, in order to achieve the active control of the first reduction 230 in the first reduction catalyst device.

Through the use of the exhaust treatment system 350 according to the present invention, the active control of the level of nitrogen dioxide $NO_2$ may be used to increase or decrease the level of nitrogen dioxide $NO_2$ in those driving modes, for which this is necessary. Thus, an exhaust treatment system may be created, which requires less precious metal and accordingly also is cheaper to manufacture.

With the use of the control according to the present invention, a fuel consumption neutral manner of increasing the reaction speed of reductions in the exhaust treatment system is obtained, since the control may be implemented in such a manner, that as large a fraction as possible of the reduction occurs via reaction paths over both nitrogen oxide NO and nitrogen dioxide $NO_2$.

Figure 5:
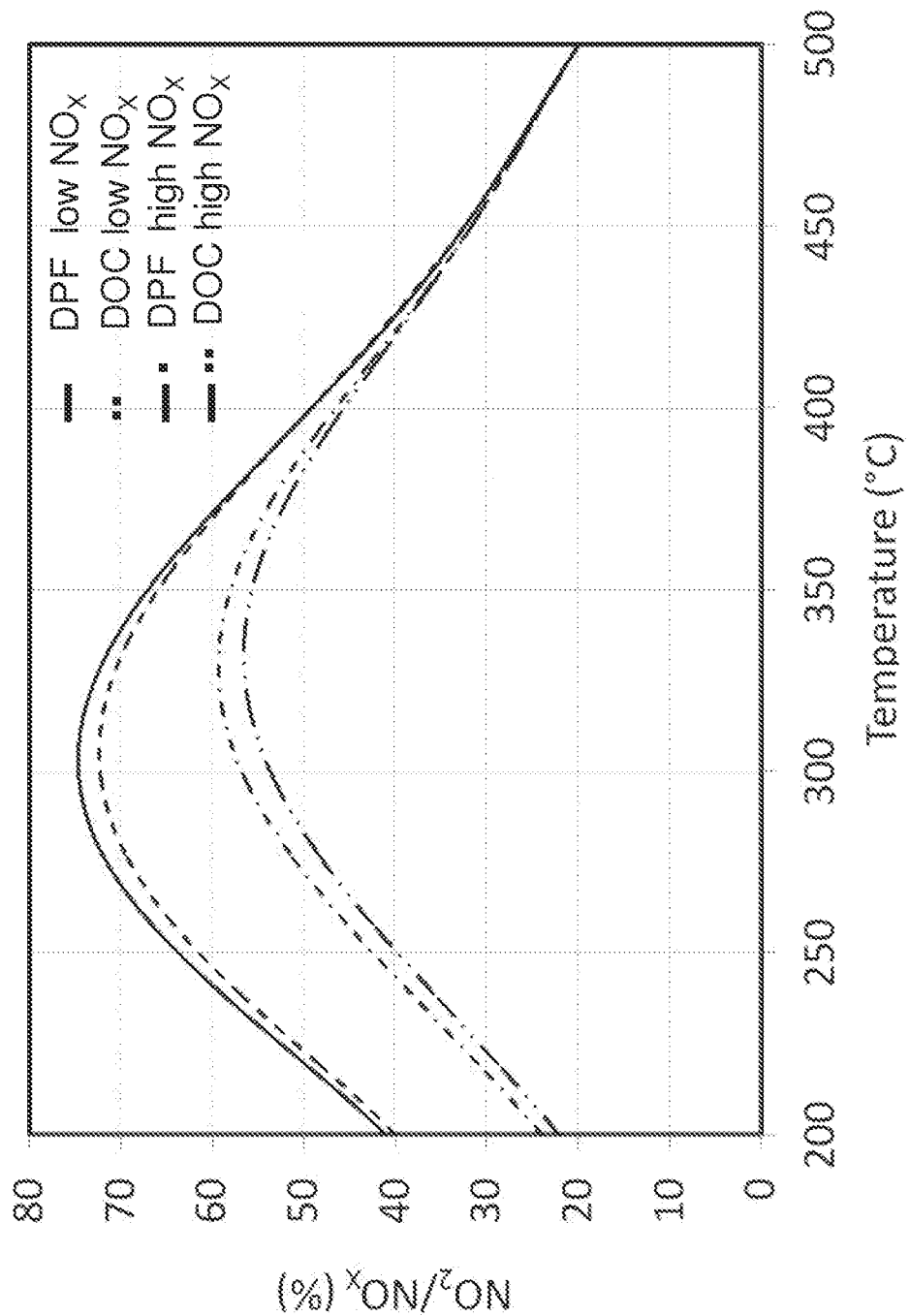
FIG. 5 shows an example of an effect of an increased $NO_x$-level.

By actively controlling the level of nitrogen oxides $NO_x$ reaching a substrate with oxidizing coating, which may, for example, be comprised in a first oxidation catalyst DOC, in a second oxidation catalyst DOC and/or in a cDPF, an adjustment of the fraction of nitrogen dioxide $NO_2$ reaching a second selective catalytic reduction catalyst arranged downstream, may be obtained. This means that the second selective catalytic reduction catalyst provides a turnover that is more predictable. For example, an increase of the amount of nitrogen oxides $NO_x$ produced by the engine may be desirable in those cases, where it is expected that there is a risk of the fraction of nitrogen dioxides $NO_2$ exceeding a maximum desired value. As an example, FIG. 5 shows an effect obtained for the fraction of nitrogen dioxide $NO_2$ at an increase of the level of nitrogen oxides $NO_x$ from a low value, for example 300 ppm, to a higher value, for example 1400 ppm. As described by the figure, the value for the ratio $NO_2/NO_x$ at DOC, and/or DPF, drops from approximately 70% to between 50% and 60%, when the level for nitrogen oxides $NO_x$ increases from 300 to 1400 ppm. This reduction of the value for the ratio $NO_2/NO_x$ considerably improves the conditions for "fast SCR".

The load on the first, and/or second devices, increases as a result of the increased level for nitrogen oxides $NO_x$. Since the increase occurs primarily at an approximate exhaust temperature of around 260-340° C., at which there is a risk of the at least one oxidizing substrate producing $NO_2/NO_x$>50%, the first 331, and/or second 332 reduction catalyst devices will have good conditions for coping with this load. At these temperatures, that is to say at 260-340° C., the first 331 and/or the second reduction catalyst device 332, depending on the respective specifications, have rather a good performance. Additionally, there are rather good conditions for vaporization of reductant at these temperatures.

According to one embodiment of the present invention, the first, and/or the second additive, comprises ammonia $NH_3$ or urea, from which ammonia may be generated/formed/released. This additive may for example consist of AdBlue. The first and the second additive may be of the same type, or may be of different types.

According to one embodiment of the present invention, the exhaust treatment system 350 comprises a system 370 for supply of additive, which comprises at least one pump 373 arranged to supply the first 371 and the second 372 dosage devices with additive, that is to say for example ammonia or urea.

One example of such a system 370 for supply of additive is schematically shown in FIG. 3, where the system comprises the first dosage device 371 and the second dosage device 372, which are arranged upstream of the first device 331, and upstream of the second device 332, respectively. The first and second dosage devices 371, 372, often consisting of dosage nozzles administering additive to, and mixing such additive with, the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized that the additive may be in liquid form and/or gaseous form. Where the additive is in liquid form, the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 180° C. According to one embodiment of the invention, the system 370 for supply of additive comprises a dosage control device 374, arranged to control the at least one pump 373, in such a manner that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, in such a manner that a second dosage of the second additive is supplied to the exhaust stream 303, via the second dosage device 372.

The first and second additives usually consist of the same type of additive, for example urea. However, according to one embodiment of the present invention, the first additive and the second additive may be of different types, for example urea and ammonia, which means that the dosage to each one of the first 331 and second 332 devices, and accordingly also the function for each of the first 331 and second 332 devices, may be optimized also with respect to the type of additive. If different types of additive are used, the tank 376 comprises several sub-tanks, which contain the different respective types of additive. One or several pumps 373 may be used to supply the different types of additive to the first dosage device 371 and the second dosage device 372. As mentioned above, the one or several tanks, and the one or several pumps, are adapted according to the state of the additive, that is to say according to whether the additive is gaseous or liquid.

The one or several pumps 373 are thus controlled by a dosage control device 374, which generates control signals for the control of supply of additive, so that a desired amount is injected into the exhaust stream 303 with the help of the first 371 and the second 372 dosage device, respectively, upstream of the first 331 and the second 332 reduction catalyst device, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

The at least one control device 374 is drawn in the figure as comprising separately marked units 378, 379. These units 378, 379 may be logically separate, but physically implemented in the same unit, or they may be both logically and physically jointly arranged/implemented. For example, these units 378, 379 may correspond to different groups of instructions, for example in the form of program code, which is fed into, and used by a processor, when the respective unit is active/used to implement the respective method steps.

The exhaust treatment system 350 may also be equipped with one or several sensors, such as one or several $NO_x$—, $NO_2$— and/or temperature sensors 361, 362, 363, 364, 365, arranged, for example, upstream of an oxidation catalyst 311 potentially arranged upstream of the first reduction catalyst device, at the inlet to the first reduction catalyst device 331, at the outlet from the first reduction catalyst device 331, at the inlet to the second oxidation catalyst 332, and/or at the outlet from the second reduction catalyst device 332, for determination of nitrogen oxides, nitrogen dioxide and/or temperatures in the exhaust treatment system. The temperature sensors 361, 362, 363, 364, 365 may thus be arranged upstream and/or downstream of the components 311, 331, 320, 312, 332 described herein in the exhaust treatment system 350. Temperature sensors may also be arranged in/at/on one or more of the components 311, 331, 320, 312, 332 in the exhaust treatment system 350.

The control device 380 may be arranged to carry out method steps, for example by carrying out instructions in the form of program code, which is fed into and used by a processor to carry out the respective method steps.

The control device 380 may be arranged to provide control signals, and/or signals corresponding to measurements carried out by the one or several $NO_x$—, $NO_2$— and/or the temperature sensors 361, 362, 363, 364, 365, to at least one dosage control device 374. The at least one dosage control device 374 thereafter bases the control of supplying dosage substance on such control signals, and/or measurement signals, so that the above mentioned active control is obtained.

The control device 380 may also be arranged to provide control signals, and/or signals corresponding to measurements carried out by the one or several $NO_x$—, $NO_2$— and/or the temperature sensors 361, 362, 363, 364, to the combustion engine 301 and/or an engine control device. The combustion engine 301, and/or the engine control device, thereafter bases the control of the engine on these control signals, and/or measurement signals, so that the above mentioned active control of the first impact is obtained through a control of the temperature, and/or the exhaust environment.

The method according to the present invention may be implemented in substantially all exhaust treatment systems comprising the first reduction catalyst device 331 described above, the second reduction catalyst device 332 described above, and the active control administration/supply of additive. Each of the first 331 and the second reduction catalyst device 332 may be arranged in a number of ways and have a number of different characteristics/functions.

In this document, a selective catalytic reduction catalyst SCR means a traditional SCR-catalyst (Selective Catalytic Reduction). SCR catalysts use an additive, often ammonia $NH_3$, or a composition from which ammonia may be generated/formed, which is used for the reduction of nitrogen oxides $NO_x$ in the exhausts. The additive is injected into the exhaust stream resulting from the combustion engine, upstream of the catalyst as described above. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

Slip-catalyst SC, as used in this document, means a catalyst which is arranged to oxidize additive, and/or to assist a selective catalytic reduction catalyst SCR with a reduction of nitrogen oxides $NO_x$ in said exhaust stream 303.

A slip-catalyst SC is thus a catalyst, which is arranged to be able to oxidize additive in the exhaust stream, and which is arranged to be able to reduce residues of nitrogen oxides $NO_x$ in the exhaust stream. In more detail, such a slip-catalyst SC is arranged primarily to reduce nitrogen oxides $NO_x$, and secondarily to oxidize additive. In other words, the slip-catalyst SC may take care of slip-residues of both additive and nitrogen oxides $NO_x$. This may also be described as the slip-catalyst SC being an extended ammoniac slip catalyst ASC, which is also set up for reduction of nitrogen oxides $NO_x$ in the exhaust stream, so that a general multifunctional slip-catalyst SC is obtained, taking care of several types of slip, meaning it takes care of both additive and nitrogen oxides $NO_x$.

In order to obtain these characteristics, that is to say to obtain a multifunctional slip-catalyst, the slip-catalyst may, according to one embodiment, comprise one or several substances comprised in platinum metals (PGM; Platinum Group Metals), that is to say one or several of iridium, osmium, palladium, platinum, rhodium and ruthenium. The slip-catalyst may also comprise one or several other substances, which give the slip-catalyst similar characteristics as platinum group metals. The slip-catalyst may also comprise an $NO_x$-reducing coating, where the coating may for example comprise Cu- or Fe-zeolite or vanadium. Zeolite may here be activated with an active metal, such as for example copper (Cu) or iron (Fe).

For the second 332 reduction catalyst device, these catalytic characteristics may be selected based on the environment to which it is exposed, or will be exposed to. Additionally, the catalytic characteristics for the first 331 and second 332 reduction catalyst device may be adapted, so that they may be allowed to operate in symbiosis with each other. The second 332 reduction catalyst device may also comprise one or several materials, providing the catalytic characteristic. For example, transition metals such as vanadium and/or tungsten may be used, for example in a catalyst comprising $V_2O_5/WO_3/TiO_2$. Metals such as iron and/or copper may also be comprised in the first 331 and/or second 332 reduction catalyst device, for example in a zeolite-based catalyst.

According to one embodiment of the present invention, the first reduction catalyst device thus comprises copper. According to an embodiment of the present invention, described above, the second reduction catalyst device comprises vanadium. According to one embodiment of the present invention, furthermore, the first reduction catalyst device is not preceded by any oxidation catalyst, that is to say the first reduction catalyst device constitutes the first active component in the exhaust treatment system. These embodiments have a number of advantages, among others in relation to sulfation of the catalysts in the exhaust treatment system.

Since the first reduction catalyst device comprises a coating comprising zeolite, which is activated with copper, an attractive performance is obtained, with a lower light-off for the catalyst, which means that the first reduction catalyst need not be preceded by an oxidation catalyst arranged upstream. Since the first reduction catalyst device comprises copper, less sulfation may be obtained in the first reduction catalyst device if no oxidation catalyst is arranged upstream of the first reduction catalyst device. This is because the nitrogen oxides $NO_x$ primarily comprise nitrogen oxides NO and the sulphur oxides $SO_x$ primarily comprise sulphur dioxide $SO_2$ for this configuration. For this configuration, the exhaust environment at the first reduction catalyst device may also mean that a temperature required to achieve de-sulphuring of the first reduction catalyst device may be kept at a relatively low level. Additionally, the first reduction catalyst's selectivity in relation to laughing gas $N_2O$ becomes more favorable, that is to say lower, in this configuration without an oxidation catalyst arranged upstream.

Since the second reduction catalyst device comprises vanadium, the second reduction catalyst device has substantially no problems with sulfation, regardless of whether an oxidation precedes the second reduction catalyst device, for example provided by a particulate filter cDPF placed upstream, at least partly coated with an oxidizing coating or by an oxidation catalyst placed upstream, or not. The second reduction catalyst may also provide an improved performance since both nitrogen oxides NO and nitrogen dioxide $NO_2$ are present in the exhaust stream, as so-called fast SCR may then be used.

The system according to the present invention may be arranged to carry out all of the method embodiments described above and in the claims, wherein the system for the respective embodiment achieves the above described advantages for the respective embodiment.

A person skilled in the art will also realize that the above system may be modified according to the different embodiments of the method according to the invention. In addition, the invention relates to a motor vehicle 100, for example a truck or a bus, comprising at least one system for treatment of an exhaust stream.

The present invention is not limited to the embodiments of the invention described above, but relates to and comprises all embodiments within the scope of the enclosed independent claims.

The invention claimed is:

1. A method for an exhaust treatment system, arranged for treatment of an exhaust stream resulting from a combustion in a combustion engine in a vehicle, said method comprising:
    an estimate of at least one future operating condition for said exhaust treatment system based on a representation of a road section ahead of said vehicle;
    a first supply of a first additive into said exhaust stream, which is used at least at a first reduction of a first amount of nitrogen oxides $NO_{x\_1}$ in said exhaust stream in a first reduction catalyst device; and
    a second supply of a second additive into said exhaust stream, which is used at a second reduction of a second amount of nitrogen oxides $NO_{x\_2}$ in said exhaust stream in a second reduction catalyst device, arranged downstream of said first reduction catalyst device, wherein
    said first supply is controlled based on said estimated at least one future operating condition in such a manner, that said first reduction catalyst device is exposed, over time, to a substoichiometric condition with respect to said first additive and to said first amount of nitrogen oxides $NO_{x\_1}$.

2. A method according to claim 1, wherein said estimate of at least one future operating condition comprises an estimate of a future temperature for said first reduction catalyst device and/or for said second reduction catalyst device.

3. A method according to claim 1, wherein said estimate of at least one future operating condition comprises an estimate of a future conversion degree of additive for said first reduction catalyst device and/or for said second reduction catalyst device.

4. A method according to claim 1, wherein said estimate of at least one future operating condition comprises an estimate of a future mass flow for said exhaust stream through said exhaust treatment system.

5. A method according to claim 1, wherein said estimate of at least one future operating condition comprises an estimate of a future soot deposit in a particulate filter, arranged downstream of said first reduction catalyst device in said exhaust treatment system.

6. A method according to claim 1, wherein:
    said first reduction catalyst device comprises a catalytic filter, wherein said catalytic filter comprises an at least partly catalytic coating with reduction characteristics; and
    said estimate of at least one future operating condition comprises an estimate of a future soot deposit in said catalytic filter.

7. A method according to claim 1, wherein said estimate of at least one future operating condition comprises an estimate of a future coverage degree of additive for said first reduction catalyst device and/or for said second reduction catalyst device.

8. A method according to claim 1, wherein said estimate of at least one future operating condition comprises an estimate of a future residue of additive for said first reduction catalyst device and/or for said second reduction catalyst device.

9. A method according to claim 1, wherein:
    said first reduction is preceded by a first oxidation of compounds comprising one or more of nitrogen, carbon and hydrogen in said exhaust stream; and
    said estimate of at least one future operating condition comprises an estimate of a future value $(NO_{2\_1}/NO_{x\_1})_{est}$ for a ratio between a first amount of nitrogen dioxide $NO_{2\_1}$ and a first amount of nitrogen oxides $NO_{x\_1}$ reaching said first reduction catalyst device.

10. A method according to claim 1, wherein:
    said second reduction is preceded by a second oxidation of compounds comprising one or more of nitrogen, carbon and hydrogen in said exhaust stream; and
    said estimate of at least one future operating condition comprises an estimate of a future value $(NO_{2\_2}/NO_{x\_2})_{est}$ for a ratio between a second amount of nitrogen dioxide $NO_{2\_2}$ and a second amount of nitrogen oxides $NO_{x\_2}$ reaching said second reduction catalyst device.

11. A method according to claim 1, wherein said estimate of at least one future operating condition comprises an estimate of a future power output for said combustion engine, wherein said future operating condition is estimated based on said power output.

12. A method according to claim 1, wherein said representation of said road section ahead of said vehicle comprises information on one or several of:
    a topography for said road section;
    a curvature for said road section;
    a traffic situation for said road section;
    road works for said road section;
    weather conditions for said road section;
    road conditions for said road section; and
    a speed limit for said road section.

13. A method according to claim 1, wherein said representation of said road section is determined based on one or more of:
    positioning information;
    sensor information;
    information provided by other vehicles; and
    map information.

14. A method according to claim 1, wherein said substoichiometric condition over time, with respect to said first additive and to said first amount of nitrogen oxides $NO_{x\_1}$, corresponds to an ammonia/nitrogen oxides ratio (ANR; Ammonia to $NO_x$ ratio) over time with a value below 1; ANR<1.

15. A method according to claim 14, wherein said ammonia/nitrogen oxides ratio ANR over time corresponds to a value in the group of:
    ANR<0.5;
    ANR<0.6;
    ANR<0.7; and
    ANR<0.8.

16. A method according to claim 1, wherein said substoichiometric condition over time, with respect to said first additive and to said first amount of nitrogen oxides $NO_{x\_1}$, depends on one or more characteristics for said first reduction catalyst device.

17. A method according to claim 1, wherein said control of said first supply of said first additive is carried out in such a manner, that said first reduction catalyst device is exposed to said substoichiometric condition except when time-limited special operating conditions prevail for said combustion engine.

18. A method according to claim 17, wherein said time-limited special operating conditions comprise transient operating conditions for said combustion engine.

19. A method according to claim 17, wherein said time-limited special operating conditions are so limited in time, that said accumulation of soot in a particulate filter in said exhaust treatment system exceeding a soot threshold value may substantially be avoided, since nitrogen dioxide $NO_2$, which may be used to facilitate an oxidation of soot particles in said particulate filter, is available in said particulate filter except when said time-limited special operating conditions prevail.

20. A method according to claim 17, wherein said time-limited special operating conditions are so limited in time, that an accumulation of soot in a catalytic filter in said exhaust treatment system exceeding a soot threshold value may substantially be avoided, since nitrogen dioxide $NO_2$, which may be used to facilitate an oxidation of soot particles in said catalytic filter, is available in said catalytic filter except when said time-limited special operating conditions prevail.

21. A method according to claim 17, wherein said time-limited special operating conditions comprise operating modes, for which said first reduction of said first amount of nitrogen oxides $NO_{x\_1}$ are given a higher priority than an oxidation of soot particles in said exhaust treatment system.

22. A method according to claim 17, wherein said time-limited special operating conditions comprise one or more of:
  operating conditions in connection with increased power output; and
  operating conditions in connection with a cold start.

23. A method according to claim 17, wherein said control of said first supply depends on one or more characteristics for said first reduction catalyst device, relating to one or more in the group of:
  catalytic characteristics for said first reduction catalyst device;
  catalyst type for said first reduction catalyst device;
  a temperature interval, within which said first reduction catalyst device is active; and
  a coverage level of ammonia for said first reduction catalyst device.

24. A method according to claim 1, wherein at least one of said first supply of said first additive and said second supply of said second additive is controlled to increase to a level, at which there is a risk of precipitates of said additive arising.

25. A method according to claim 1, wherein at least one of said first supply of said first additive and said second supply of said second additive is controlled to decrease, following which residues of at least one of said first and second additives are eliminated by heat in said exhaust stream, wherein said decrease of said supply is carried out, if the required total catalytic function for an exhaust treatment system carrying out said method may be provided after said decrease.

26. A method according to claim 25, wherein said required catalytic function depends on currently measured, modelled and/or predicted operating conditions for said combustion engine.

27. A method according to claim 25, wherein said decrease of said supply constitutes an interruption of said supply.

28. A method according to claim 1, wherein said second supply is further controlled based on said estimated at least one future operating condition, so that said first reduction and said second reduction jointly provide a required total catalytic function.

29. A computer program product comprising computer program code stored on a non-transitory computer-readable medium, said computer program product for an exhaust treatment system, arranged for treatment of an exhaust stream resulting from a combustion in a combustion engine in a vehicle, said computer program product comprising computer instructions to cause one or more computer processors to perform the following operations:
  an estimate of at least one future operating condition for said exhaust treatment system based on a representation of a road section ahead of said vehicle;
  a first supply of a first additive into said exhaust stream, which is used at least at a first reduction of a first amount of nitrogen oxides $NO_{x\_1}$ in said exhaust stream in a first reduction catalyst device; and
  a second supply of a second additive into said exhaust stream, which is used at a second reduction of a second amount of nitrogen oxides $NO_{x\_2}$ in said exhaust stream in a second reduction catalyst device, arranged downstream of said first reduction catalyst device, wherein
  said first supply is controlled based on said estimated at least one future operating condition in such a manner, that said first reduction catalyst device is exposed, over time, to a substoichiometric condition with respect to said first additive and to said first amount of nitrogen oxides $NO_{x\_1}$.

30. An exhaust treatment system arranged for treatment of an exhaust stream, resulting from a combustion in a combustion engine in a vehicle, said system comprising:
  a control device, arranged to estimate at least one future operating condition for said exhaust treatment system, based on a representation of a road section ahead of said vehicle;
  a first dosage device, arranged to carry out a first supply of a first additive into said exhaust stream, which is used at least at a first reduction of a first amount of nitrogen oxides $NO_{x\_1}$ in said exhaust stream in a first reduction catalyst device; and
  a second dosage device, arranged to carry out a second supply of a second additive into said exhaust stream, which is used at a second reduction of a second amount of nitrogen oxides $NO_{x\_2}$ in said exhaust stream in a second reduction catalyst device, arranged downstream of said first reduction catalyst device, wherein
  said control device is arranged to control said first supply based on said estimate of at least one future operating condition in such a manner, that said first reduction catalyst device over time is exposed to a substoichiometric condition, with respect to said first additive and said first amount of nitrogen oxides $NO_{x\_1}$.

31. An exhaust treatment system according to claim 30, further comprising one or more of:
  a first oxidation catalyst, arranged upstream of said first oxidation catalyst, in order to oxidize compounds comprising one or more of nitrogen, carbon, and hydrogen in said exhaust stream; and
  a second oxidation catalyst, which is arranged upstream of said second dosage device, in order to oxidize one or more of nitrogen oxide NO and incompletely oxidized carbon compounds in said exhaust stream.

32. An exhaust treatment system according to claim 30, wherein said first reduction catalyst device comprises one from among the group of:
- a first selective catalytic reduction catalyst ($SCR_1$);
- a first selective catalytic reduction catalyst ($SCR_1$), integrated downstream with a first slip-catalyst ($SC_1$), wherein the first slip-catalyst ($SC_1$) is arranged to oxidize a residue of additive, and/or to assist the first selective catalytic reduction catalyst ($SCR_1$) with an additional reduction of nitrogen oxides $NO_x$ in said exhaust stream;
- a first selective catalytic reduction catalyst ($SCR_1$), followed downstream by a separate first slip-catalyst ($SC_1$), wherein the first slip-catalyst ($SC_1$) is arranged to oxidize a residue of additive, and/or to assist said first selective catalytic reduction catalyst ($SCR_1$) with an additional reduction of nitrogen oxides $NO_x$ in said exhaust stream;
- a first slip-catalyst ($SC_1$), arranged to oxidize a residue of additive and/or to carry out a reduction of nitrogen oxides $NO_x$ in said exhaust stream; and
- a catalytic filter (SCRF) consisting of a particulate filter comprising an at least partly catalytic coating with reduction characteristics.

33. An exhaust treatment system according to claim 30, wherein said second reduction catalyst device comprises one from among the group of:
- a second selective catalytic reduction catalyst ($SCR_2$);
- a second selective catalytic reduction catalyst ($SCR_2$), integrated downstream with a second slip-catalyst ($SC_2$), wherein said second slip-catalyst ($SC_2$) is arranged to oxidize a residue of additive, and/or to assist said second selective catalytic reduction catalyst ($SCR_2$) with an additional reduction of nitrogen oxides $NO_x$ in said exhaust stream;
- a second selective catalytic reduction catalyst ($SCR_2$), followed downstream by a separate second slip-catalyst ($SC_2$), wherein said second slip-catalyst ($SC_2$) is arranged to oxidize a residue of additive, and/or to assist said second selective catalytic reduction catalyst ($SCR_2$) with an additional reduction of nitrogen oxides $NO_x$ in said exhaust stream; and
- a second slip-catalyst ($SC_2$), arranged to oxidize a residue of additive and/or to carry out a reduction of nitrogen oxides $NO_x$ in the exhaust stream.

34. An exhaust treatment system according to claim 30, further comprising one of:
- a particulate filter, arranged downstream of said first reduction catalyst device and upstream of said second reduction catalyst device, in order to catch and oxidize soot particles; and
- a particulate filter at least partly comprising a catalytically oxidizing coating, which is arranged downstream of said first reduction catalyst device and upstream of said second reduction catalyst device, and which is arranged to catch and oxidize soot particles, and to oxidize one or more of nitrogen oxides NO and incompletely oxidized carbon compounds in said exhaust exhaust stream.

35. An exhaust treatment system according to claim 30, wherein said control device is arranged to comprise, in said estimate of at least one future operating condition, an estimate of a future power output for said combustion engine, wherein said future operating condition is estimated based on said power output.

36. An exhaust treatment system according to claim 30, wherein said representation of said road section ahead of said vehicle comprises information on one or several of:
- a topography for said road section;
- a curvature for said road section;
- a traffic situation for said road section;
- road works for said road section;
- weather conditions for said road section;
- road conditions for said road section; and
- a speed limit for said road section.

37. An exhaust treatment system according to claim 30, wherein said representation of said road section is determined based on one or more of:
- positioning information;
- sensor information;
- information provided by other vehicles; and
- map information.

38. An exhaust treatment system according to claim 30, wherein said control device is arranged to control said second supply based on said estimated at least one future operating condition in such a manner, that said first reduction and said second reduction jointly provide a required total catalytic function.

* * * * *